United States Patent [19]

Miller et al.

[11] 4,307,376

[45] Dec. 22, 1981

[54] PATTERN RECOGNITION SYSTEM FOR GENERATING HEMATOLOGY PROFILE

[75] Inventors: Melvin N. Miller, Wynnewood; John C. Bouton, Doylestown; Dennis L. Tebbe, West Chester; Eugene L. Leboy, Philadelphia; Reddiar S. Anbalagan, West Chester, all of Pa.

[73] Assignee: Geometric Data Corporation, Wayne, Pa.

[21] Appl. No.: 4,130

[22] Filed: Jan. 17, 1979

Related U.S. Application Data

[63] Continuation of Ser. No. 749,129, Dec. 9, 1976, abandoned.

[51] Int. Cl.³ .............................................. G06K 9/00
[52] U.S. Cl. ..................... 340/146.3 CA; 235/92 PC; 356/39
[58] Field of Search ................................... 235/92 PC; 340/146.3 CA, 146.3 AC, 146.3 AG; 364/416, 515; 356/39; 128/2 G

[56] References Cited

U.S. PATENT DOCUMENTS

| 3,192,505 | 6/1965 | Rosenblatt | 340/146.3 AG |
|---|---|---|---|
| 3,297,989 | 1/1967 | Atchley et al. | 340/146.3 G |
| 3,483,512 | 12/1969 | Atkins | 340/146.3 MA |
| 3,562,502 | 2/1971 | Kautz | 340/146.3 AG |
| 3,686,486 | 8/1972 | Coulter et al. | 235/92 PC |
| 3,827,804 | 8/1974 | Miller et al. | 356/178 |
| 3,832,687 | 8/1974 | Miller et al. | 340/146.3 AC |
| 3,845,466 | 10/1974 | Hong | 340/146.3 H |
| 3,873,974 | 3/1975 | Bouton et al. | 340/146.3 AC |
| 4,045,655 | 8/1977 | Suzuki et al. | 235/92 PC |
| 4,125,828 | 11/1978 | Resnick et al. | 356/39 |

OTHER PUBLICATIONS

Bacus et al., "Leukocyte Pattern Recognition" *IEEE Tran. on Systems, Man and Cybernetics*, vol. SMC-2, No. 4, 9-1972, pp. 513-526.

Seiverd, C. E., *Hematology for Medical Technologists*, Phila.: Lea & Febiger, 1972., pp. 243-248.

*Primary Examiner*—Leo H. Boudreau
*Attorney, Agent, or Firm*—Caesar, Rivise, Bernstein & Cohen, Ltd.

[57] ABSTRACT

A system is disclosed for generating a maturity index for blood cells which may be used in a hematology profile to show the health of a patient. The system includes a scanning system for scanning a cell, pattern recognition means connected to the scanning means for generating a plurality of groups of signals, each group representative of a different characteristic of the cell scanned, and calculation means responsive to the signals for calculating an index of maturity for the cell scanned in accordance with its characteristics.

7 Claims, 8 Drawing Figures

FIG. 3
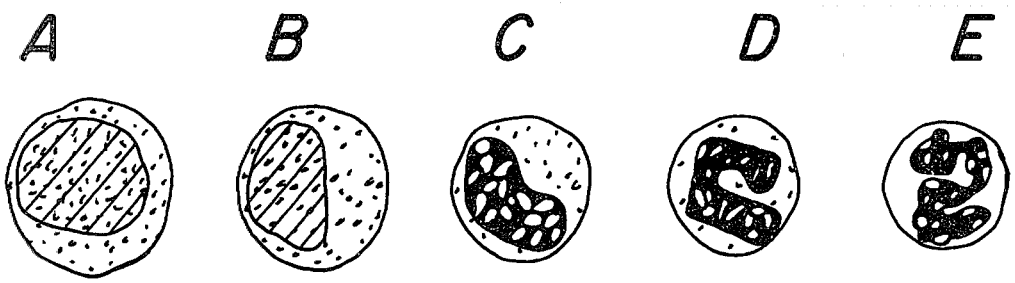
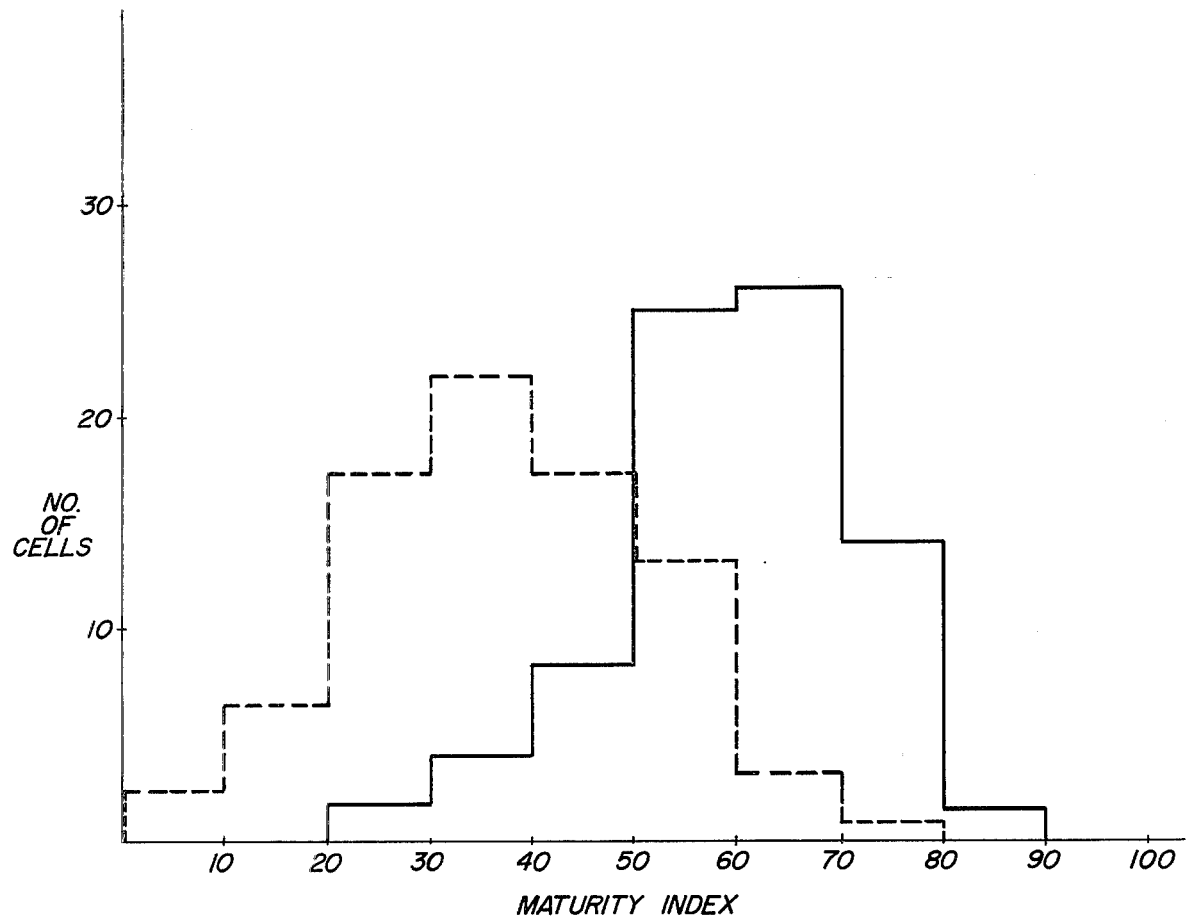
FIG. 4

PATTERN RECOGNITION SYSTEM FOR GENERATING HEMATOLOGY PROFILE

This is a continuation of application Ser. No. 749,129, filed Dec. 9, 1976 now abandoned.

This invention relates generally to an automatic blood cell differential analyzer and more particularly to a system for automatically generating a hematology profile which is usable to quickly determine whether a patient is ill or well.

One of the more important tests for determining the health of people is to make a differential white cell count of their blood. In order to make a differential white cell count in blood, a sample of whole blood is smeared and dried on a slide and a Wright stain is used to enhance the contrast. A hundred or more of the white cells are observed, recognized and classified in order to accomplish the differential white cell count.

The differential blood cell count has been performed manually since the beginning of the Twentieth Century. More recently pattern recognition systems have made it possible to perform white blood cell differential counts automatically.

Among the ways that a white blood cell differential count is used to determine the health of a person whose blood is being examined is the detection of immature cell types, as well as a high percentage of normal cell types on the more immature end of the maturity cycle.

That is, in healthy blood it can usually be expected that in a white blood cell differential count the number of neutrophilic band white cells will be less than 10% of the white blood cells counted. Similarly, it can usually be expected that in normal blood there will be found no neutrophilic metamyelocytes or neutrophilic myelocytes, which are immature forms of neutrophils which are normally found only in bone marrow.

The determination that a particular sample of blood is form that of an unhealthy person is readily apparent when there are present in the blood such cells as the neutrophilic myelocyte and the neutrophilic metamyelocyte. However, the difficulty of determining the health of blood is not nearly as accurate when it is based on the percentage of neutrophilic band white cells in the white blood cell differential count. That is, the separation between a band and a segmented neutrophil is not normally that clear. For example, there are three major definitions which are current in this country which are used by treating hospitals to distinguish a band from a segmented neutrophil.

One definition of the cross-over line from a band to a segmented neutrophil is when the narrowest part of the band is less than one-third of the normal part of the band. When the narrowest part of the band is greater than one-third of the normal part of the band, then it is a band neutrophil. If it is less than one-third, then it is a segmented neutrophil.

Another widely accepted definition is based on the thickness of the filament. If the narrowest part of the filament is more than one chromatin in thickness, then it is a band. If it is less then one chromatin in thickness, then it is a segmented neutrophil. The filament is that which is the connecting link between two or more segments of a neutrophil nucleus.

One of the problems in using either one of these tests is that a whole blood smear is not a flat object, but rather is a three-dimensional object wherein the top portion of the nucleus may be hiding the filament or otherwise covering the filament and therefore the filament cannot be totally viewed to determine how narrow it is. Accordingly, what may normally look like a band neutrophil could just as easily be a segmented neutrophil where the filament between two or more segments is hidden and therefore two segments look like a band to both the manual discriminator or the automatic discriminator.

Another problem is that due to observing a small sample from a large population with present techniques, a count of 10%, indicated through either a manual white blood cell classification or an automatic white blood cell classification, can easily be off 6%. This would mean that just through statistical variation the reading may be an actual count of anywhere from four to sixteen band neutrophils in a sample of one hundred white blood cells. It can therefore be seen that the determination of whether a person is healthy or unhealthy, based on there being a count of 10% or more band neutrophils, is often inaccurate.

In addition, the inaccuracy possible in a percentage determination is increased in manual blood cell classification because the counting is done at high speed and the white blood cells are not always in sharp focus. There is great difficulty in determining whether a borderline band neutrophil is that or a segmented neutrophil. As a consequence, the overall error based upon the previously described errors is in excess of 6% on the slide and therefore the test for unhealthy blood based on a percentage of band neutrophils being greater than 10% is highly inaccurate.

In the book entitled "The Blood Picture and its Clinical Significance," by Dr. Victor Schilling, published by the C. V. Mosby Company in 1929, Dr. Schilling points out that Arneth had called attention to "the left shift" of the neutrophilic leukocytes as the most important part of the histologic changes in connection with clinical diagnosis and prognosis. The description, beginning at page 146 of the Schilling book, describes that in most infections or toxic diseases, there was a transformation of the nuclei of neutrophils, from the segmented nucleus of the normal neutrophilic cell to simple sausage, bean or ball shapes.

Arneth even suggested sub-dividing the classes of neutrophils into further divisions, namely, little lobed, deeply lobed, spheric and loop-like. After setting down the neutrophils on a slide into these classes, he demonstrated the systematic appearance of "a shift of the neutrophil picture to the left" in cases of infection. He also suggested a slight shift to the right (highly segmented cells) may also occur in cases of scurvy, pernicious anaemia and others.

Schilling points out that Arneth's method was too difficult and therefore attempted to replace it with a "more practical scheme" that classifies neutrophils as myelocytes, juvenile forms, stabs and segmented neutrophils and refers to a nucleur shift index based on the above. Schilling then went on to state that the exclusive use of the index obscures the histologic picture.

It can be seen from the description set forth in Schilling that it is very desirable to identify the age or maturity of a neutrophil as a measure of the infection process, but the traditional means of counting lobes or describing the shape is inadequate to the task. The difficulties of recognizing the maturity of a neutrophilic white cell based on the shape along is made even more difficult by the fact that in a blood smear the shape is often distorted and, in addition, the three-dimensional nature of a smear tends to obscure and hide filaments which would enable the distinguishment of a band from a segmented neutrophil.

It is therefore an object of this invention to overcome the aforementioned disadvantages of the prior art.

Still another object of the invention is to provide a new and improved device for generating disease indices of blood cells based on a plurality of characteristics of the cells.

Still another object of the invention is to provide a new and improved system which enables the generation of a hemotology profile which will quickly illustrate to the physician examining the results whether a blood sample shows whether the person whose blood is examined is healthy or unhealthy.

Yet another object of the invention is to provide a new and improved blood cell classification system which enables the use of all of the neutrophils in a blood cell differential count to determine the health of a patient.

Still another object of the invention is to provide a new and improved system for generating a hematology profile which includes a graphical representation of the number of neutrophilic cells versus the maturity of the cells.

These and other objects of the invention are achieved by providing a system for producing a hematology profile which comprises means for scanning blood cells in a whole blood smear, means responsive to the scanning means for producing signals representative of a plurality of characteristics of a particular type of blood cell, and calculation means responsive to the signals for generating a cell index. Storage means are also provided for storing the cell index of each blood cell of the particular type in the whole blood smear and display means are provided for providing a graphic display of the number of cells at a plurality of maturity index ranges.

Other objects and many of the attendant advantages of this invention will be readily appreciated as the same becomes better understood by reference to the following detailed description when considered in connection with the accompanying drawing, wherein:

FIG. 3 is a maturation sequence of a neutrophilic white cell from the time that it is a promyelocyte to the time that it becomes a segmented neutrophil;

FIG. 4 is a graphical representation of the number of cells versus the maturity index of neutrophilic white cells;

Referring now in greater detail to the various figures of the drawing wherein like reference numerals refer to like parts, the pattern recognition system embodying the invention is shown generally in FIG. 1.

Figure 1:
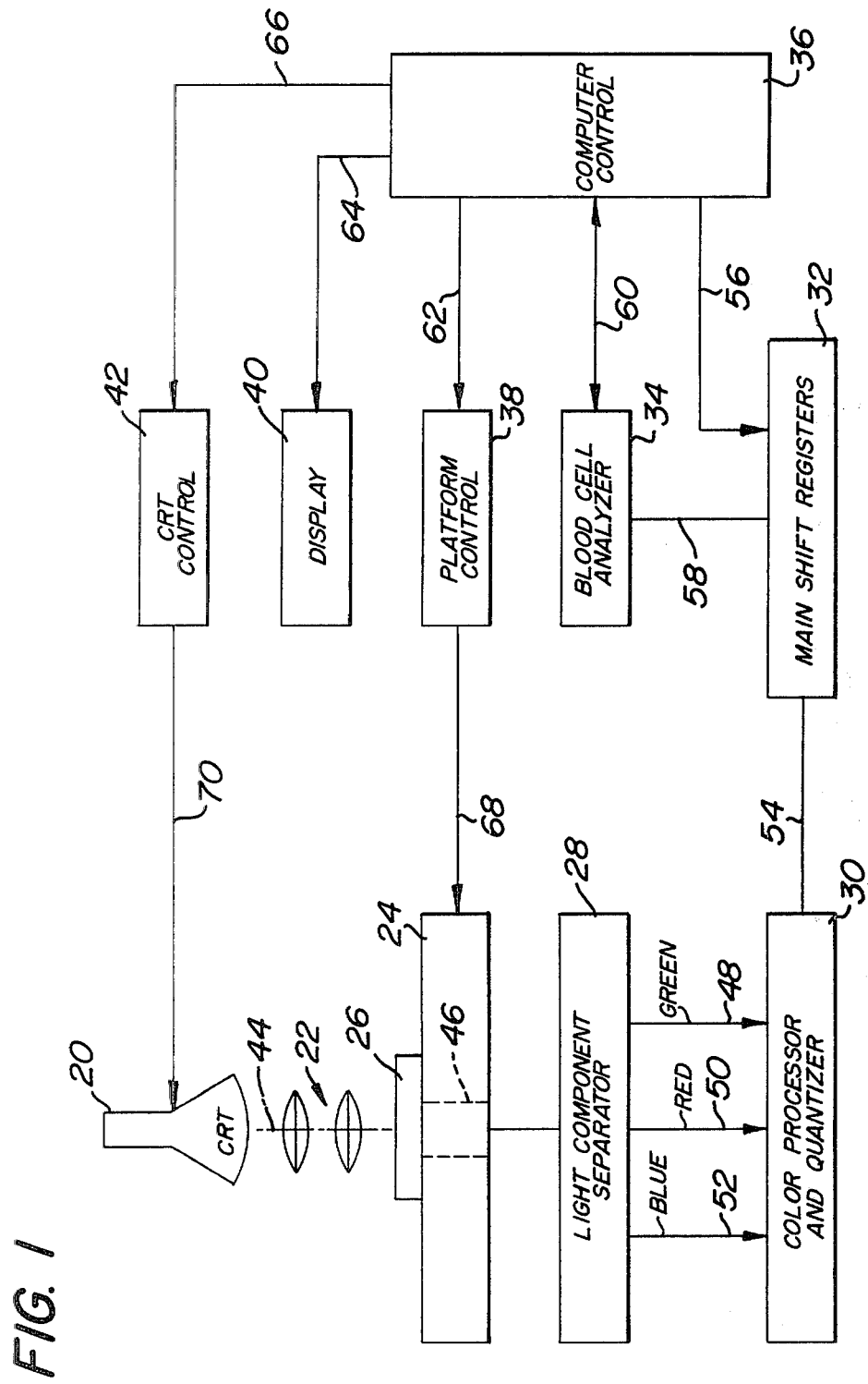
FIG. 1 is a schematic block diagram of a pattern recognition system embodying the invention.

The pattern recognition system in FIG. 1 is adapted to provide a differential white cell count from a whole blood smear.

The system includes a flying spot scanner optical system which includes a cathode ray tube 20, a microscopic lens system 22, a platform 24 for supporting a glass slide 26 having a whole blood smear thereon, a light component separator 28, a color processor and quantizer 30, main shift registers 32, blood cell analyzer 34, computer control 36, platform control 38, display 40 and CRT control 42. The cathode ray tube (CRT) 20 and the microscopic lens system 22 are preferably mounted within a housing which is light sealed so that a beam of light 44 can be directed through the microscopic lens system onto a slide 26. The platform 24 and the light component separator 28 are also encased in a housing to prevent light, other than the beam of light 44, from entering the light component separator 28. The platform 24 includes an opening 46 through which the beam 44 is directed to the light component separator.

The beam of light 44 is produced by the cathode ray tube 20 which provides a spot on the face of the tube in a scan raster which is directed and focused by the microscopic lens system down to a field of the size approximately 300 microns X 300 microns.

The scan raster is directed at the slide 26 to traverse approximately a field of that size in the blood smear. The light passing through the slide 26 is directed to the light component separator which filters the incoming beam and provides light through three spectral channels. The red, green and blue channels are chosen in accordance with the spectral absorbance of the component dyes in the Wright stain. The light component separator and the color processor and quantizer are the subject of U.S. Pat. No. 3,827,804 issued on Aug. 6, 1974 to Miller, Levine and Partin for Color Separation For Discrimination in Pattern Recognition Systems and assigned to the Assignee herein. The disclosure in U.S. Pat. No. 3,827,804 is incorporated by reference herein.

As set forth in U.S. Pat. No. 3,827,804 a light component separator includes a pair of dichroic mirrors and three photomultipliers. The light beam 44 passes through the blood smear on glass slide 26, enters the light component separator 28 and the green component of light beam 48 is filtered out of beam 44 and is provided to a photomultiplier which produces a signal on output line 48 which is representative of the green component of the light beam. Similarly, the red signal is filtered out and provided to a photomultiplier which generates a signal on line 50 which is representative of the red component and the photomultiplier which receives the blue component of light produces a signal on line 52 which is representative of the blue component of the portion of beam 44 passing through the smear on slide 26. The signals from the photomultipliers in light component separator 28 are fed via lines 48, 50 and 52 to the color processor and quantizer 30. The color processor and quantizer 30 preprocesses the signals on lines 48, 50 and 52 and quantizes the signals for providing the signals in binary form to the plurality of shift registers in the main shift registers 32. The computer control 36 provides shift pulses on line 56 to the main shift register 32. The data received from the color processor and quantizer 30 is connected to the main shift registers via the lines 54 and the signals are shifted through the shift registers 32. The blood cell analyzer 34 is connected via lines 58 and senses the various signals in the shift register as the binary quantization of the three component signals is passed through the main shift registers 32. The blood cell analyzer is also connected via lines 60 to the computer control 36.

The computer control 36, in addition to providing control signals to the blood cell analyzer and the main shift register via lines 60 and 56, respectively, is also connected to the platform control 38 via lines 62 to the display 40 via lines 64 and to the CRT control via line 66. The platform control receives signals from the computer control and provides signals on output lines 68 for controlling the movement of the platform 24 which supports the slide, so that after each cell has been scanned and recognized the platform can be moved in order that another portion of the blood smear can be placed in the focus of the pattern recognition system. The CRT control 42 is connected via lines 70 in the cathode ray tube 20 and causes the various modes of scan in accordance with the requirements of the optical pattern recognition system.

The determination that a white blood cell is being scanned by the flying spot scanner and is in the field scanned is made in accordance with the teachings in U.S. Pat. No. 3,873,974 issued on Mar. 25, 1975 to Bouton and Partin and assigned to the Assignee herein. The disclosure in U.S. Pat. No. 3,873,974 is incorporated by reference herein.

The platform control includes a stepping motor for moving the platform 24 in a predetermined pattern to assure that a separate and distinct field is viewed in each of the succeeding scans of the slide 26. The recycling of the beam 44 is controlled by the CRT control 42 which is connected to the computer control 36 via line 66.

Figure 2:
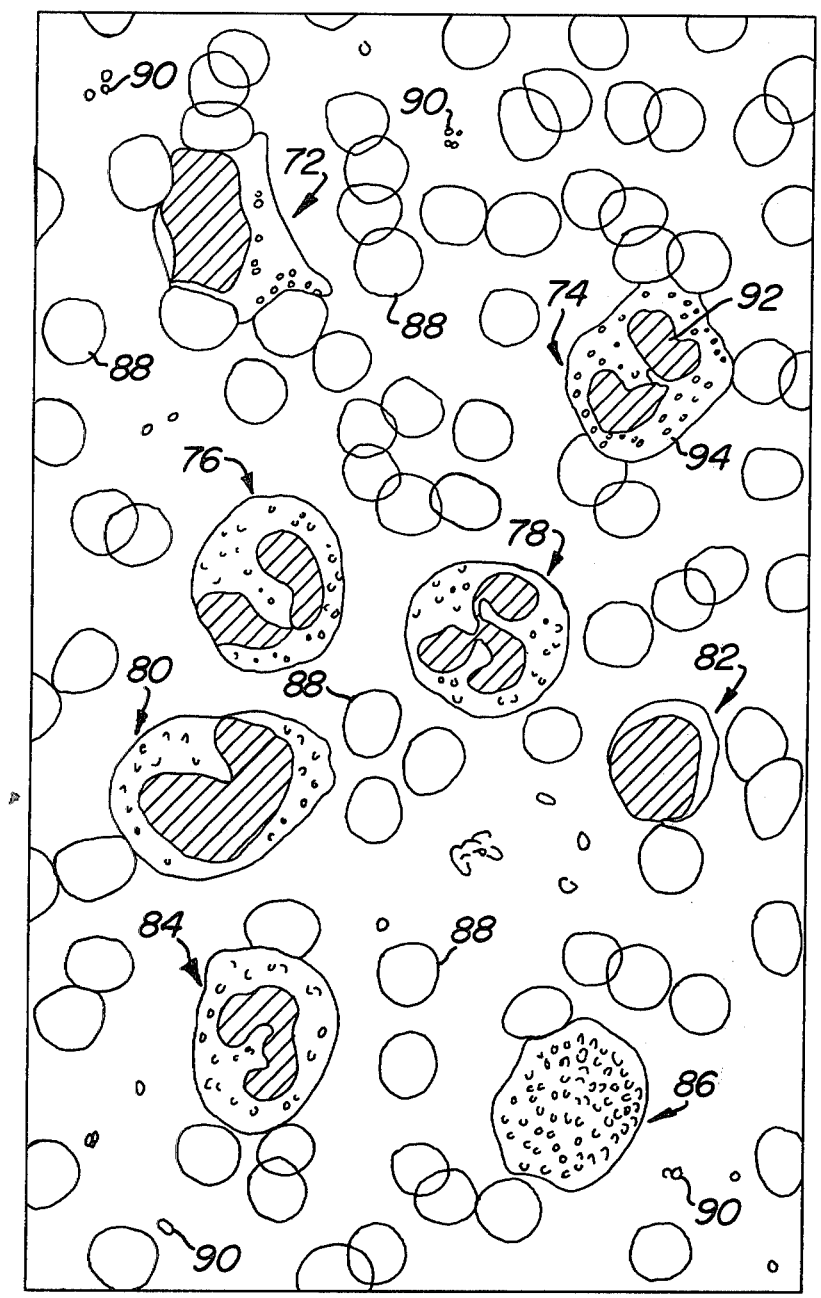
FIG. 2 is a graphic representation of an enlarged top plan view of a rectangular portion of a field in a whole blood smear with a larger population of white cells than is normal.

FIG. 2 is a diagrammatic representation of a blood smear of peripheral blood from normal type individuals. As can be seen therein, there are various classes of patterns within the blood smear. A first class of patterns in the blood smear is the white blood cells which include cells 72, 74, 76, 78, 80, 82, 84 and 86. Cell 72 is a lymphocyte white cell, cell 74 is a neutrophilic segmented white cell, cell 76 is an eosinophil white cell, cell 78 is a neutrophilic segmented white cell, cell 80 is a monocyte white cell, cell 82 is a lymphocyte white cell, cell 84 is a neutrophilic band white cell and cell 86 is a basophil white cell.

A second class of patterns found in a blood smear are the red cells 88, which are found throughout the blood smear around and adjacent to the various white cells. In addition there is a third class of patterns which comprises platelets 90 which are also scattered throughout the blood smear.

The portion of the blood smear shown in FIG. 2 includes three cells of the neutrophilic type. Thus, cells 74, 78 and 84 are neutrophilic white cells. Cell 84 is the most immature of the three being a neutrophil of the band type. Cell 74 is a segmented neutrophil having two segments and the most mature is cell 78 which has a nucleus which is broken into three segments. Each of the white cells includes a nucleus and a cytoplasm. For example, in cell 74 the nucleus is that portion with the legend 92 and the cytoplasm is the portion with the legend 94. The nucleus is thus the shaded portion of each of the white cells shown in FIG. 2.

Referring to FIG. 3, it can be seen how the neutrophilic cells mature. Cell A is a promyelocyte, cell B is a neutrophilic myelocyte, cell C is a neutrophilic metamyelocyte, cell D is a neutrophilic band and cell E is a segmented neutrophil.

Immature cells are large cells and become progressively smaller as they mature. When the cells are young, the nuclei are large in relationship to the cytoplasm. However, as the cells age the relative size of the nucleus decreases.

All of the cells originate from undifferentiated mesenchymal cells. The youngest of these cells for each cell type has similar morphological characteristics and usually cannot be differentiated by appearance alone.

The neutrophilic line is formed from a myeloblast and as the embryonic cells change from their earlier forms to more mature cell types, they undergo changes in nucleur and cytoplasmic characteristics common to all cells.

In its earliest form a neutrophilic cell is the promyelocyte cell shown at A in FIG. 3. The promyelocyte is produced by the myeloblast when it develops distinct granules which in the earlest stages are dark blue or reddish blue.

The nucleus is substantially round and relatively large with respect to the cytoplasm of the promyelocyte.

The first sign that a promyelocyte is becoming a neutrophilic myelocyte is when the granules differentiate to such a degree that one can identify the fact that it has become a neutrophilic myelocyte as shown at B in FIG. 3.

The myelocyte is considered to be the first form of neutrophilic differentiation, as opposed to a basophilic or eosinophilic cell which can also be formed from the promyelocyte.

As the neutrophilic cell matures from the myelocyte form to the metamyelocyte, the nucleus becomes slightly indented and smaller, with pinkish-blue granules. It should be noted that the myelocyte was larger and that the metamyelocyte has a relatively smaller nucleus as well as better defined chromatin structures which are the darker portions of the nucleus shown at C in FIG. 3.

The next stage of maturation of the neutrophil is shown at D in FIG. 3, which is the neutrophilic band and again it is smaller than the previous form with the nucleus becoming more U-shaped than the nucleus in the metamyelocyte.

Finally, the more mature of the neutrophilic cells is the cell shown at E in FIG. 3 which includes a segmented nucleus and again the cell has become slightly smaller than when it was in the form shown at D in FIG. 3.

Just as the nucleus matures, the shape, density, color size and other characteristics of the cell are changing. Normally, only the cells of the type shown at D and E in FIG. 3 are found in the peripheral blood.

It should be noted that the neutrophilic band forms normally constitute from 1% to 6% of the white cells in the peripheral blood of healthy individuals. An increase in the number of band neutrophils in the blood which is known as a shift to the left is an indication of the blood of an unhealthy person.

In FIG. 4, a graph is shown in which there is plotted a graph of the number of cells versus the maturity index of a neutrophilic cell. The maturity index ranges from zero to 100, with the most mature neutrophils being in the 90 to 100 range. The solid line shown in the graph of FIG. 4 represents the distribution of white cells in the blood of a healthy person. The dotted line on the graph represents distribution of neutrophils in the blood of a person who is unhealthy. What this means is that as the person becomes ill there are more immature neutrophils in the blood than is otherwise the case.

As will hereinafter be seen, one of the objects of this invention is to generate a cell or characteristic index for all of a plurality of cells of a similar type and use the same to generate a disease index for a patient. One particular type of cell index which is used to provide important health information is a maturity index for each neutrophilic white cell detected in an examination of a whole blood smear to provide a white cell differential count.

By providing a maturity index for all of the neutrophilic cells, there is a greater mass of neutrophils examined simultaneously, which easily enables a physician to determine not only the unhealthiest of patients, but also patients who are becoming ill as well as on their way to recovery. It will be seen that the maturity index is based not only on the various shapes of the nucleus, but also takes into consideration the size, color and other characteristics of the maturation process of a neutrophil. It should be noted that the characteristics are determined from measurements which are made in the examination of the various normal white cells to distinguish them from each other in a white cell differential count by the automatic pattern recognition system of Miller & Levine, U.S. Pat. No. 3,832,687 assigned to the Assignee herein.

Figure 5:
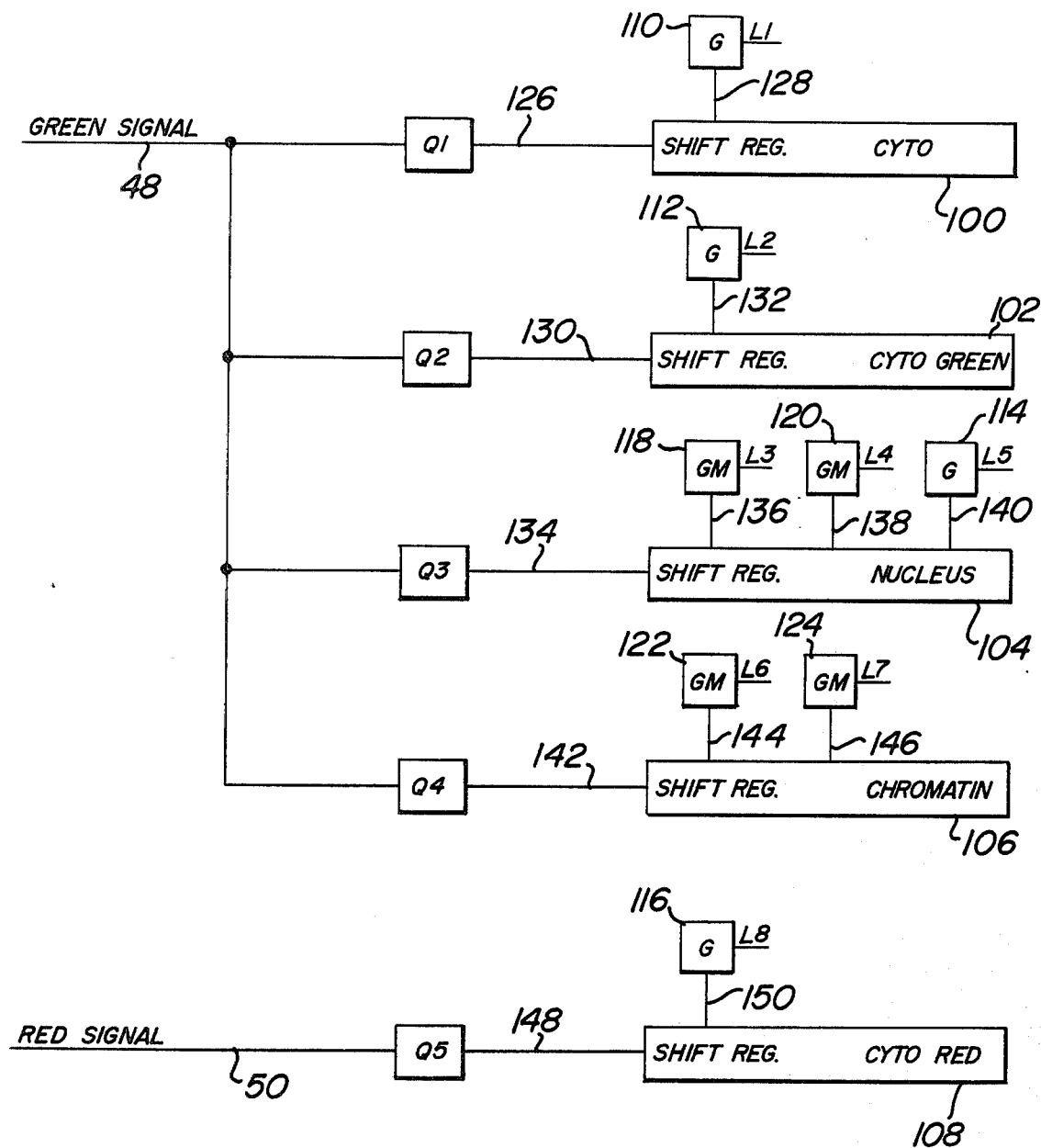
FIG. 5 is a schematic block diagram of a portion of the blood cell analyzer.

FIG. 5 shows a schematic block diagram of a portion of the automatic pattern recognition system which is utilized for extracting the characteristics which are used for identifying and determining the maturity of a neutrophilic white cell.

The circuitry in FIG. 5 includes five quantizers, Q1, Q2, Q3, Q4 and Q5, five shift registers, 100, 102, 104, 106 and 108. The circuitry also includes a plurality of gates 110, 112, 114, and 116 and a plurality of group multiplexers, 118, 120, 122 and 124. The input of quantizers Q1, Q2, Q3 and Q4 are connected to the output line 48 of the light component separator which carries the signal representative of the green component of the light in the field scanned by the cathode ray tube 20. Connected to the input of Q5 is line 50 from the light component separator which includes the signal representative of the red component of the field scanned. The green signal, which is generated by the photomultiplier in the light component separator 28, provides the necessary information for distinguishing the shape of the nucleus and of the cytoplasm of a white cell and is the preferred channel for discriminating the pattern from the various white cell patterns.

The blood cell analyzer 34 thus utilizes the green channel in the determination of the specific type of white cell that has been scanned by the scanning means 20.

Quantizer Q1 is set at a low threshold level to determine the shape of the least dense portion of the cytoplasm. That is, Q1 is set at a level which causes the binary quantization of the green signal on line 48 to include the entire outline of the cytoplasm and effectively the entire white cell. Thus, the output of Q1, which is connected to shift register 100 via line 126, is the binary quantization of the overall shape of the white cell. Shift register 100 is utilized by the blood cell analyzer for determining the overall shape of the cell. The blood cell analyzer is preferably made in accordance with the pattern recognition system shown in U.S. Pat. No. 3,832,687 issued on Aug. 27, 1974 to Miller and Levine and assigned to the Assignee herein.

As seen therein, the pattern analyzer includes a plurality of group multiplexers and gating means for distinguishing patterns passing through the shift register.

The group multiplexers simulate the effect of dropping an infinite number of geometric patterns unrelated to the pattern being examined and determining the number of times specific points on a pattern all coincide with the pattern being examined. A statistical analysis is made of the number of times that the geometric pattern falls on the pattern scanned to distinguish various shapes. In addition, the gating means shown in Pat. No. 3,832,687 is usable for determining the entire mass of a pattern scanned.

The gate 110 in FIG. 5 is connected to one stage of the shift register 100 via line 128. As the binary quantization of the cytoplasm is shifted through shift register 100 each time the signal is high in the stage of the shift register to which gate 110 is attached, gate 110 is enabled thereby producing a signal on line L1. The gate 110 includes another input from the computer control (not shown) which is utilized for sampling the signal in the shift register stage during the period that the bit is located in the shift register.

The quantizer Q2 is set at a low density level which has a threshold at or near a level at which there will be more and more information in the signal as the cytoplasm becomes pinker in color. The output of quantizer Q2 is connected via line 130 to shift register 102. The signal on line 130 is thus a binary quantization of the cytoplasm in the green channel which is utilized in combination with gate 112 to determine when the cytoplasm becomes pinker.

Gate 112 is connected to a stage of shift register 102 via line 132 and each time the signal in that stage goes high the gate 112 provides a pulse on output line L2.

Quantizer Q3 has a threshold level which is to determine patterns having more density than the cytoplasm and basically produce the binary quantization of the shape of the nucleus which is inserted into shift register 104. Quantizer Q3 is connected to shift register 104 via line 134. Shift register 104 has connected thereto a group multiplexer 118 via lines 136, a group multiplexer 120 via lines 138 and gate 114 via line 140.

The group multiplexer 118 is similar to the group multiplexers 110 shown in U.S. Pat. No. 3,832,687 and comprises a plurality of gates, each of which have two inputs which are connected to separate stages of the shift register. Each of the gates in the group multiplexer 118 are connected to a different plurality of stages of the shift register 104 and effectively superimpose upon the binary quantization that passes through shift register 104 a plurality of lines in a plurality of different angular dispositions. The effect of this superimposition of lines is to simulate the dropping of a single line a substantially infinite number of times over the pattern provided in shift register 104. For each position that the binary quantization is shifted through the shift register 104 the group multiplexer 118 determines whether the ends of the line in a plurality of dispositions are superimposed over the nucleus pattern. Each time that there is a superimposition of the end of the line over the pattern, a pulse is produced on output line L3 of group multiplexer 118.

The group multiplexer 120 includes a plurality of gates, each of which has three input lines connected to three different stages of shift register 104. This effectively simulates the dropping of a line a substantially infinite number of times over a nucleus pattern and causes the statistical determination of the number of times that three specific points of the line, hereinafter referred to as triplets (Δ) falls on the pattern. In each position of the binary quantization of the nucleus that passes through the shift register 104, there will be a plurality of tests to determine whether the point of the triplet in different angular dispositions are superimposed over the pattern of the nucleus. Each time that the three points of the triplet are provided over the nucleus, the group multiplexer provides a pulse on output line L4.

Gate 114 is a single gate which is connected to one stage of the shift register 104 and effectively provides a pulse on line L5 each time a high signal is shifted through the stage of the shift register to which gate 114 is attached.

The quantizer Q4 is set at a threshold level which has its threshold exceeded only when the signal contains chromatin information which is the darkest portion of the nucleus. Thus, the binary quantization generated by quantizer Q4 and passed to the shift register 106 via line 142 is a signal which is representative of the shape of the chromatin in the nucleus. The binary quantization from Q4 is thus passed to shift register 106 and is examined by a pair of group multiplexers 122 and 124. Group multiplexer 122 is connected to shift register 106 via lines 144 and group multiplexer 124 is connected to shift register 106 via lines 146. The group multiplexer 122 is a line drop group multiplexer which includes a plurality of gates connected to a plurality of pairs of stages in the shift register 106 to simulate line drops. The group multiplexer 124 is a group multiplexer having a plurality of gates, each of which is connected to a different set of three stages of the shift register to simulate the dropping of triplets on the pattern. The group multiplexer 122 produces a pulse on output line L6 each time the ends of a line are on the chromatin pattern. Similarly, the group multiplexer 124 generates a pulse on line L7 each time the three points of the triangle are superimposed over the chromatin structure.

The red signal on line 50 is connected to a quantizer Q5 which is set to a threshold level in accordance with quantizer Q2. The amount of red signal that will exceed the threshold Q5 increases when the cytoplasm is bluer. The binary quantization of the cytoplasm in the red signal is generated by Q5 to shift register 108 via line 148 which is connected therebetween.

Gate 116 is connected via line 150 to shift register 108 and enables a pulse on line L8 each time the signal is high in the stage to which gate 116 is connected.

It should be understood that the whole blood smear, as it is affected by the Wright stain, causes the cytoplasm in a more immature neutrophil to be very blue. As it gets older, it loses its color and gets pinker. Quantizers Q2 and Q5 provide to shift registers 102 and 108 information which vary in accordance with the maturity of the neutrophil. Thus, by comparing the information provided in shift registers 102 and 108, there is a change of the ratio of information provided in the shift registers as the neutrophil gets older.

In addition, the group multiplexers and the gates which are connected to the shift registers also extract data which can be utilized to calculate various factors and characteristics of the cell being examined therein.

Figure 6:
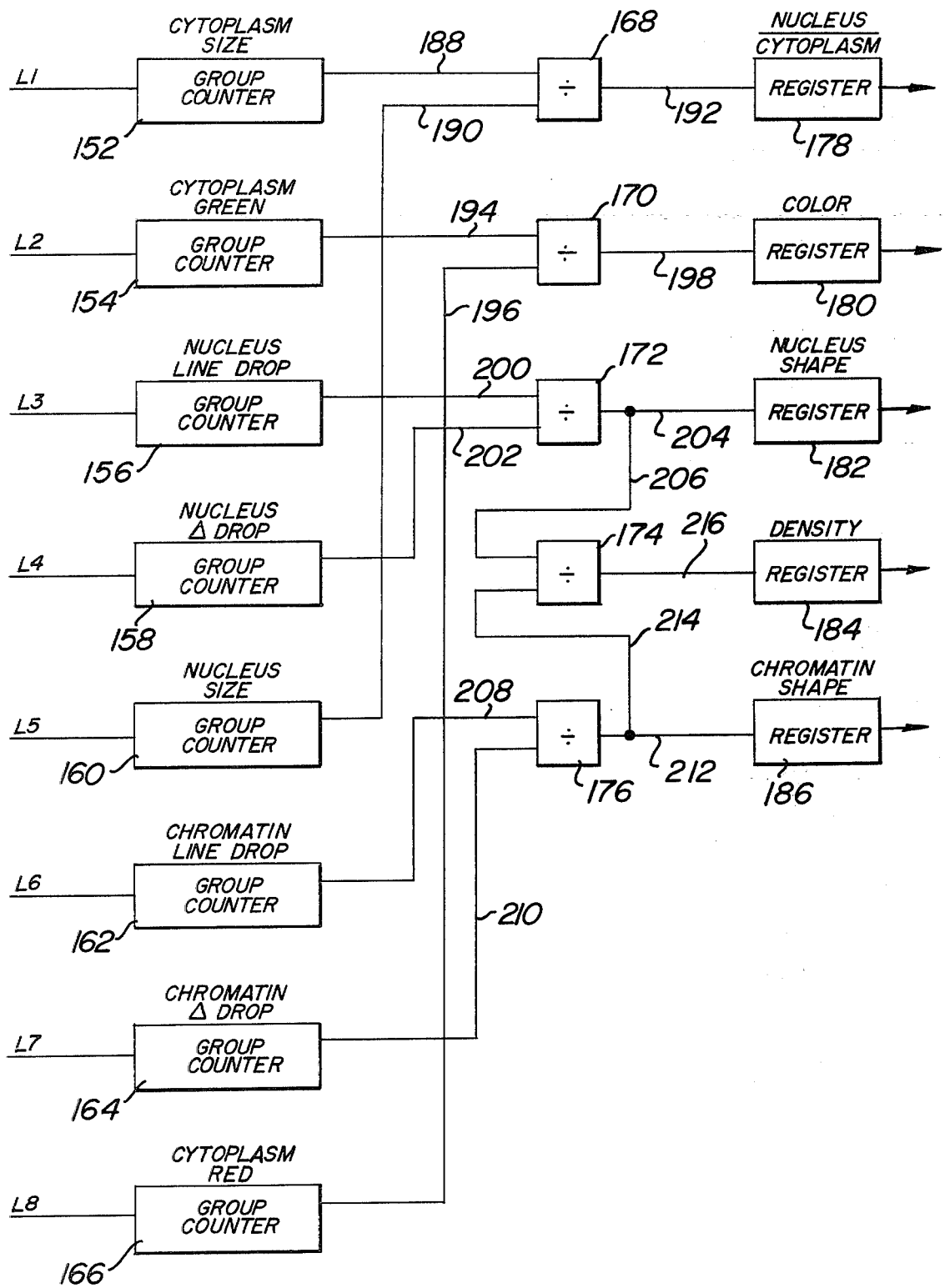
FIG. 6 is a schematic block diagram of the characteristic analyzer.

This information is provided via lines L1 through L8 to the plurality of group counters shown in FIG. 6. The circuitry in FIG. 6 includes a plurality of group counters 152, 154, 156, 158, 160, 162, 164 and 166, a plurality of dividers 168, 170, 172, 174, and 176 and a plurality of registers 178, 180, 182, 184 and 186.

The output line L1 from gate 110 in FIG. 5 is connected to the input of group counter 152.

The output of gate 112 on line L2 is connected to group counter 154, the output of group multiplexer 118 is connected via line L3 to group counter 156. The output of group multiplexer 120 is connected via line L4 to group counter 158, the output of gate 114 is connected via line L5 to group counter 160. The output of group multiplexer 122 is connected via line L6 to group counter 162, the output of group multiplexer 124 is connected via line L7 to group counter 164 and the output of gate 116 is connected via line L8 to group counter 156. Each time a pulse is provided on line L1 from the gate 110, group counter 152 is stepped and after a cell has been passed completely through the shift register 100 the count in group counter 152 is completed. The count in group counter 152 is proportional to the size of the cytoplasm in view of the fact that the larger the cytoplasm the larger is the count in group counter 152. The counter 154 is stepped each time gate 112 is enabled and thereby includes a count which is also proportional to the size, but is affected by the amount of pink provided in the cytoplasm. Group counter 156 is stepped each time there is a pulse provided on line L3, which effectively provides a count of the number of times that the ends of the line are superimposed over the nucleus pattern. Similarly, group counter 158 is stepped each time line L4 is pulsed, thereby giving a count of the number of times the three points of the triplet are superimposed over the nucleus.

The group counter 160 is stepped each time gate 114 is enabled and thereby provides a count which is proportional to the size of the nucleus since the larger the nucleus the larger the count is in the group counter 160.

The group counter 162 is stepped each time both ends of the lines are superimposed over the chromatin of the nucleus. Group counter 164 is stepped each time the three points of the triplet are superimposed over the chromatin of the nucleus. The group counter 166 is stepped each time gate 116 is enabled, thereby providing a count which is proportional to the size of the cytoplasm, but which is affected by the amount of blue color that is in the cytoplasm.

The output of group counter 152 is connected via line 188 to one input of divider 168. The second input of divider 168 is connected to the output line 190 of group counter 160. The divider 168 divides the signal on line 188 into the signal on line 190 to provide to a register 178 via lines 192 a signal which is proportional to the ratio of the size of the nucleus to the cytoplasm. The ratio of the nucleus to the cytoplasm tends to decrease as the cell becomes more mature. As seen in FIG. 3, in the promyelocyte, the nucleus is more than one-half of the entire cell size and as the cell gets older, the nucleus becomes more dense and thereby becomes a smaller proportion of the size of the cell.

The output of group counter 154 is connected via lines 194 to the first input of divider 170. The second input of divider 170 is connected to line 196 from the output of group counter 166. The divider provides via lines 198 to the register 180 a signal representative of the ratio of the cytoplasm signal found in the green channel with that in the red channel. As the cell matures, the ratio of the green to the red channel becomes greater as the cytoplasm goes from blue to pink. Accordingly, the count in color register 180 is affected by the maturity of the cell. The output of group counter 156 is connected to one input of divider 172 via line 200. The second input of divider 172 is connected to output line 202 of the group counter 158. The output of the divider 172 is provided on line 204 to register 182 and via line 206 to the first input of divider 174. Register 182 thus contains information which is changeable in accordance with the changes of shape in the nucleus as it matures.

That is, as the nucleus changed shape from a band nucleus, as shown at D in FIG. 3, to that which is typical of the more mature neutrophil, i.e., at E in FIG. 3, (the segmented nucleus), the ratio of the two point events, as opposed to the three point events which is a ratio of the number of times that the ends of the lines are superimposed over the pattern with respect to the number of times that the points of the triplet are superimposed over the pattern varies in accordance with the maturity of the cell and is recorded in register 182. Register 182 thus provides information which is affected by the change of shape in the nucleus.

The output of group counter 162 is connected via line 208 to a first input of divider 176 and the output of group counter 164 is connected via lines 210 to the input of divider 176. The output of divider 176 is connected via line 212 to the register 186 and via lines 214 to the second input of divider 174.

The output of divider 176, which is provided to register 186, includes information relative to the chromatin which is determined by a ratio of the number of times the ends of lines are superimposed over the chromatin structure with respect to the number of times the points of the triplet dropped on the same pattern are superimposed.

A ratio of the nucleus shape and the chromatin shape data provided by the dividers 172 and 176 is also compared to provide a ratio which is provided via the output lines 216 of divider 174 to the register 184 and provide a measure of the density of the nucleus.

It will hereinafter be seen that the characteristics which are provided in group counter 152 and registers 178 through 186 can be averaged on a weighted basis in accordance with the importance of the characteristic to provide a maturity index.

Figure 7:
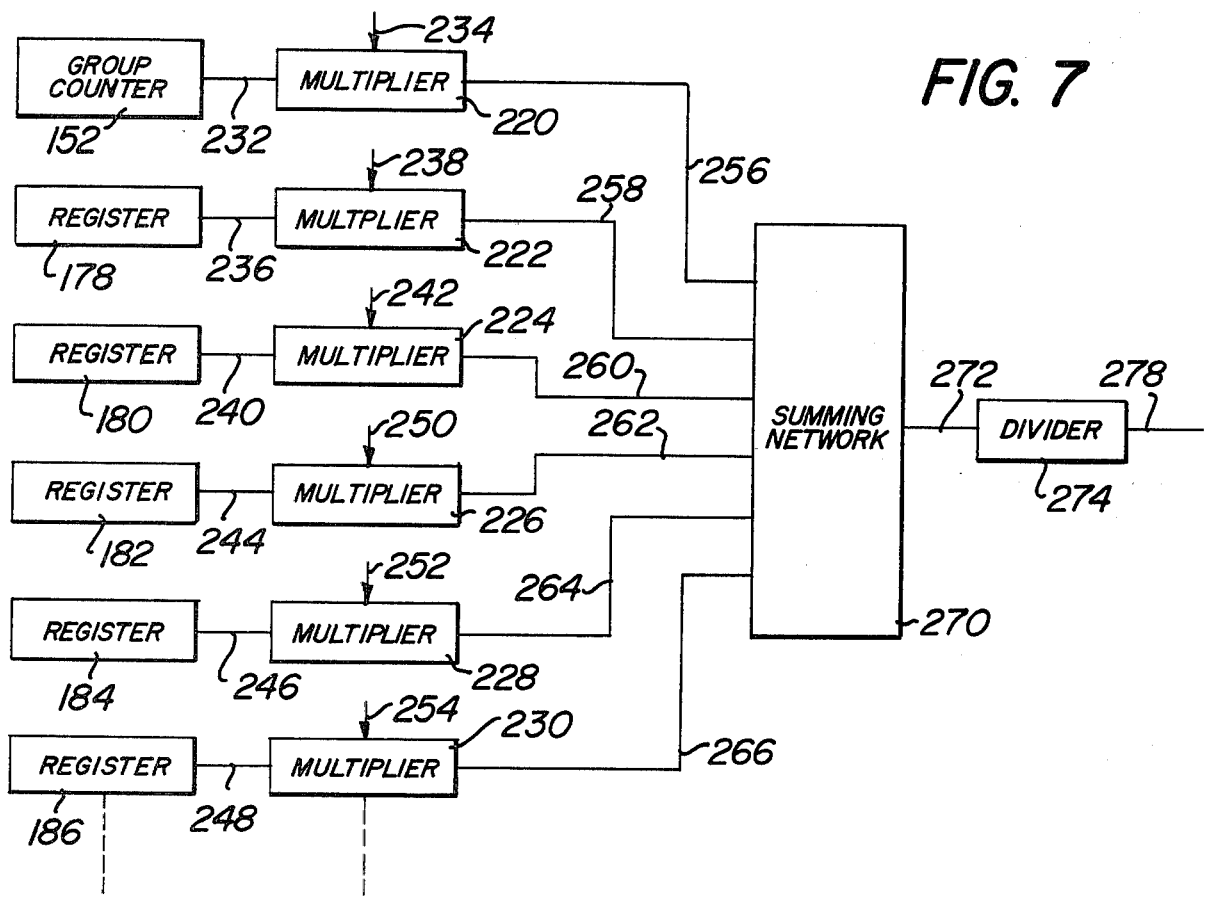
FIG. 7 is a schematic block diagram of the maturity index calculator.

Referring to FIG. 7, it can be seen that FIG. 7 includes the L1 group counter 152 and registers 178 through 196. In addition, the circuitry of FIG. 7 includes six multipliers 220, 222, 224, 226, 228 and 230. The output of the group counter 152 is connected via line 232 to the multiplier 220. The multiplier also has an input provided via lines 234 which is connected to the output of the computer control. The signals provided on line 234 are empirically developed numbers which are based on the factor that the number provided in the group counter 152 should be multiplied by in order to determine its importance in calculating the maturity index. Register 178 is connected to the multiplier 222 via lines 236 and the number in the register 178 is multiplied by the data provided on lines 238 from the computer control to multiplier 222. Register 180 is connected via lines 240 to multiplier 224 and the second input of multiplier 224 is connected via lines 242 to the output of the computer control. Similarly, the registers 182, 184 and 186 are connected to multipliers 226, 228 and 230 via lines 244, 246 and 248 and each of these multipliers 226, 228 and 230 include input lines 250, 252 and 254 which are respectively connected thereto and are provided via the computer control.

The data provided on lines 234, 238, 242, 250, 252 and 254, which is used to multiply the numbers provided in the group counter 152 and registers 178 through 186 are all empirically developed in accordance with the importance that a characteristic has in connection with the determination of the maturity of a neutrophil. The outputs of multipliers 220 through 230 are connected via output lines 256, 258, 260, 262 and 264 and 266, respectively, to a summing network 270. The summing network 270 adds the output signals provided on lines 256 through 266 and provides this number on line 272.

The signals provided on lines 272 are fed to divider 274. The divider 274 divides the total number in the summing network 270 by a number which has been empirically determined to provide a number on line 278 which varies between zero and 100 and is the maturity index of the neutrophil in accordance with the factors or characteristics of the cells that have been examined by the blood cell analyzer.

It should be noted that this maturity index 278 is determined only when a neutrophil is detected. It should also be noted that similar characteristics can be used to determine the maturity of other while blood cells, such as the lymphocyte, monocyte, eosinophil and basophil types of white cells, as is discussed hereinafter.

Figure 8:
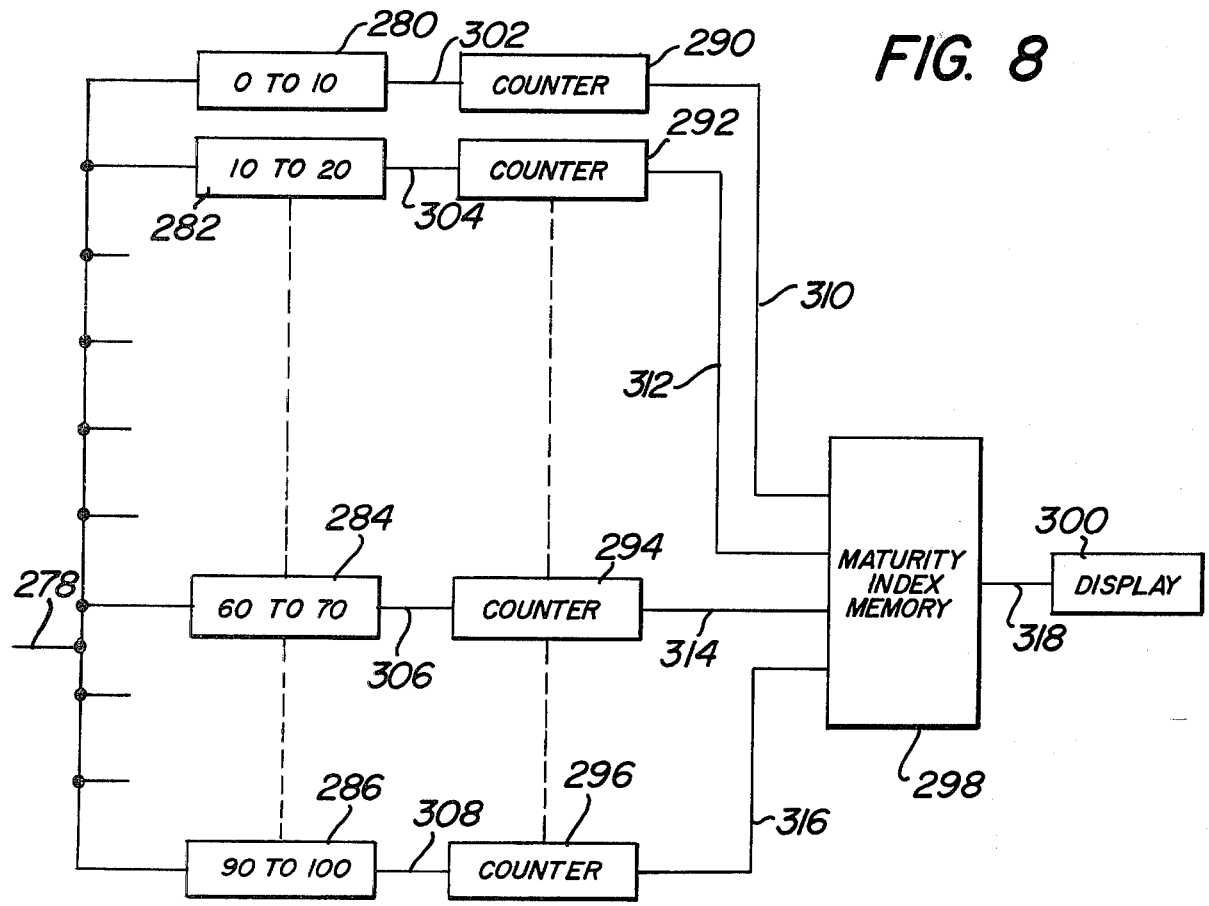
FIG. 8 is a schematic block diagram of the hematology profile circuitry.

Each time the maturity index for a cell is provided on output line 278, it is fed to the circuitry of FIG. 8 which includes ten comparators, only four of which comparators 280, 282, 284 and 286 are shown for purposes of clarity. The circuitry in FIG. 8 further includes ten counters, only four of which counters 290, 282, 294 and 296 are shown. Finally, the circuitry of FIG. 8 includes a maturity index memory 298 and a display 300.

The circuitry of FIG. 8 is included in the computer control and effectively sorts the neutrophil cells which have been identified by the pattern recognition system and classifies them in accordance with the maturity index of the cell. Thus, if the signal on line 278 is representative of a number between zero and 10, the comparator 280 is enabled and thereby provides a pulse on output line 302 which is connected to counter 290 and thereby steps counter 290. Similarly, the output count of comparator 282 is connected to counter 292 via line 304 and comparator 282 is enabled each time the signal on line 278 is representative of a maturity index between 10 and 20. Comparator 284 is connected to counter 294 via line 306 and the comparator is enabled each time the signal on line 278 is representative of a maturity index between 60 and 70. The comparator 286 is connected to counter 296 via line 308 and the comparator 286 is enabled each time the maturity index is between 90 and 100. The remaining six comparators (not shown) are provided for the other ranges of maturity index.

Counters 290 through 296 thus include the counts of the number of neutrophilic cells in each range of maturity. The output of counters 290 through 296 are connected to the maturity index memory via lines 310, 312, 314 and 316, respectively. Counters (not shown) are also provided for the six other ranges of maturity. The maturity index memory stores the various counts and is connected to a display via lines 318 to visually display a graphic representation of the number of maturity cells at each of ten ranges of the maturity index from 0 to 100. The display 300 may be either a cathode ray tube display or a printer. Thus, after a whole blood smear has been examined by the pattern recognition system, where one hundred or more white cells are examined, the number of cells in each of the ranges of maturity are similar to that shown in FIG. 4 on the solid line graph where the whole blood smear was that of a healthy person.

The maturity index displayed in graphical form as that shown in FIG. 4 provides an important tool to a physician to determine the health of a patient rapidly. In view of the fact that the maturity index of all of the neutrophils is examined simultaneously, as opposed to only those cells which are considered to be band neutrophils, there is a greater probability that a shift to the left on the maturity index accurately indicates the ill health of a patient.

Another cell or characteristic index which provides valuable information to determine the health of a patient is an abnormality index which is determined for each lymphocyte cell in a manner similar to that used for generating a maturity index for a neutrophil. That is, each lymphocyte found in a whole blood smear is examined by the pattern recognition system and as it is examined characteristics are extracted which are used for identifying and determining the abnormality of the lymphocyte.

Thus, the type of cell index that is generated for all of the lymphocytes found in a whole blood smear is labelled an abnormality index which is generated from the characteristics found in the various lymphocytes examined in a whole blood smear for each lymphocyte examined. Such an abnormality index uses similar characteristics to those used with respect to the maturity index, such as the size, color, density, etc., and is generated in a manner similar to that used in connection with the generation of a maturity index. By determining the number of lymphocytes which fall into each range of the abnormality index, a profile is generated similar to the profile which is generated for an immaturity index. As the number of abnormal cells found in a blood sample increases, there is a shift in the profile or graph which indicates that there is a disease state in the blood of the patient.

Still another hemotology profile which can be determined and which can be generated from the use of the invention herein is a cell index which is generated for each neutrophil based on the differences in neutrophils produced in bone marrow and that which is circulated in the peripheral blood. It has been found that certain disease states cause a large percentage of marrow segmented neutrophils to be present in the peripheral blood. Therefore, discrimination of the two groups of neutrophils provides valuable information for determining the health state of a patient. In the past, such a discrimination of the two groups of neutrophils has not been visually or otherwise characterized. This invention is useable to generate an index as to the differences in morphology between the marrow and peripheral segmented neutrophils to detect the presence of certain diseases in the individual.

In addition, this invention further contemplates utilizing combinations of two to three profiles based on different cell indices, the cross-correlation of which also aids in the determination of the health of a particular patient.

The graphical representation of the number of cells versus the cell indices such as the maturity index as shown in FIG. 4, provides a hematology profile to the physician which enables a quick determination of the ill health of a person, even where the person has not yet become radically ill. That is, because all of the neutrophils are being examined in this hematology profile, the gradations of infection which cause a shift to the left of the hematology profile can be determined in accordance with the degree of the infection. Thus, an effective tool is provided for determining not only when a person is becoming ill, but also healthy. For example, in therapy this provides a physician with a chart which enables the determination of whether an infection is being reduced as a result of treatment.

In addition, the hematology profile is usable as an index of patient health.

It should be understood that, in addition to the six factors or characteristics of the white cells examined, there are other characteristics which do change as a cell becomes more mature which can be used to calculate the maturity index.

This system, in addition to the shape determination, also includes characteristics of the cytoplasm size, the nucleus to cytoplasm ratio, the color, density and chromatin shape to determine a cell index such as the maturity index. Accordingly, a powerful tool is provided which is usable not only to determine a maturity index for cells, but also to provide a hematology profile which is readily usable for determining the health by examination of a patient's whole blood. It acts to rid many of the uncertainties in the classical determination by using an index which is based on a plurality of factors and not just based on the shape of the nucleus which can vary in accordance with the pressure applied to a cell when a blood smear is made and also by the three-dimensional nature of a whole blood smear.

Without further elaboration, the foregoing will so fully illustate our invention that others may, by applying current or future knowledge, readily adapt the same for use under various conditions of service.

What is claimed as the invention is:

1. A pattern recognition system having apparatus for generating an index of a cell's maturity, including a scanning system for scanning a cell, pattern recognition means connected to said scanning means for generating a plurality of groups of signals, each group representative of a different characteristic of the cell scanned, and calculation means responsive to said signals for calculating a cell maturity index for the cell scanned in accordance with its characteristics, said calculation means including means for assigning a different weight to different ones of said characteristics to generate signals representative of said characteristics in accordance with their relation to the cell's maturity and means for combining said characteristic signals so that a weighted average is calculated which is representative of the position of the cell in the continuous range from immature to mature cell.

2. The system of claim 1 wherein the characteristics utilized for determining the maturity index include the size, color, and density of the cell.

3. The system of claim 1 wherein the cell is a white blood cell and the characteristics utilized include size, shape, color and density.

4. The system of claim 1 wherein the characteristics include chromatic texture.

5. The system of claim 1 wherein the cell is a neutrophilic white cell and the system further includes means for storing the cell maturity index of each neutrophil examined during the whole blood smear analysis.

6. The system of claim 1 wherein a plurality of cells are examined and the cell maturity index generated therefor, said system further including means for discriminating the maturity index of each cell in accordance with a plurality of ranges and a plurality of counters for totaling the number of cells in each range of cell maturity index and display means for displaying a graphical representation for the number of cells in each of the plurality of different ranges of cell maturity index.

7. A pattern recognition system having apparatus for determining a disease state including means for scanning blood cells in a whole blood smear, means responsive to said scanning means for producing signals representative of a plurality of characteristics of a particular type of blood cell, calculation means responsive to said signals for generating a maturity index representative of the position of the cell in the continuous range from immature to mature cell and storage means for storing the maturity index of each blood cell of said particular type in said whole blood smear and display means for providing a graphic display of the number of cells at a plurality of index ranges within the entire range from immature cell to mature cell.

* * * * *